US012671463B2

(12) United States Patent
Singh et al.

(10) Patent No.:  US 12,671,463 B2
(45) Date of Patent:      Jun. 30, 2026

(54) DUAL-PHASE AND IMPULSE BASED ULTRA-WIDEBAND ARCHITECTURE

(71) Applicant: Infineon Technologies AG, Neubiberg (DE)

(72) Inventors: Ajinder Pal Singh, Allen, TX (US); Cecilia Carbonelli, Munich (DE); Daniel Lee, Salt Lake City, UT (US)

(73) Assignee: Infineon Technologies AG, Neubiberg (DE)

( * ) Notice:    Subject to any disclaimer, the term of this patent is extended or adjusted under 35 U.S.C. 154(b) by 79 days.

(21) Appl. No.: 18/922,853

(22) Filed:      Oct. 22, 2024

(65)              Prior Publication Data

US 2026/0113071 A1      Apr. 23, 2026

(51) Int. Cl.
    *H04B 1/717*       (2011.01)
    *G01S 13/02*       (2006.01)
    *G01S 13/46*       (2006.01)
(52) U.S. Cl.
    CPC .......... *H04B 1/717* (2013.01); *G01S 13/0209* (2013.01); *G01S 13/46* (2013.01); *G01S 2013/468* (2013.01); *H04B 2201/71634* (2013.01)
(58) Field of Classification Search
    CPC ....... H04B 2201/71634; G01S 13/0209; G01S 2013/468; G01S 13/878; H01Q 5/25
    See application file for complete search history.

(56)              References Cited

U.S. PATENT DOCUMENTS

2022/0295483  A1*   9/2022   Jain ......................... G01S 13/76
2022/0321164  A1*  10/2022   D'Andrea .......... H04B 1/71637
2024/0077574  A1*   3/2024   Joo ..................... G01S 13/0209

OTHER PUBLICATIONS

Singh et al, An IR-UWB IEEE 802.15.4z Compatible Coherent Asynchronous Polar Transmitter in 28-nm CMOS, IEEE Journal of Solid-State Circuits, vol. 56, No. 12, Dec. 2021 (Year: 2021).*
S. M. Riazul Islam, Sana Ullah, Md. Humaun Kabir, M. A. Ameen, and Kyung Sup Kwak, A TR-UWB Downconversion Autocorrelation Receiver for Wireless Body Area Network, Hindawi Publishing Corporation, EURASIP Journal on Wireless Communications and Networking, Jul. 21, 2009 (Year: 2009).*
Nick Van Helleputte, Marian Verhelst, Member, Wim Dehaene and Georges Gielen, A Reconfigurable, 130 nm CMOS 108 pJ/pulse , Fully Integrated IR-UWB Receiver for Communication and Precise Ranging, IEEE Journal of Solid-State Circuits, vol. 45, No. 1, Jan. 2010 (Year: 2010).*
(Continued)

*Primary Examiner* — Aristocratis Fotakis
(74) *Attorney, Agent, or Firm* — Eschweiler & Potashnik, LLC

(57)              ABSTRACT
An ultra-wideband receiver with enhanced signal detection capabilities is provided. In one example, the receiver includes a first processing path comprising first de-spreading circuitry that de-spreads a received UWB signal based on a first bit value to generate a first magnitude value, a second processing path comprising second de-spreading circuitry that de-spreads the received UWB signal based on a second bit value to generate a second magnitude value, and data recovery circuitry. Data recovery circuitry is configured to compare the first magnitude value to the second magnitude value and output a bit value based on the comparison.

20 Claims, 5 Drawing Sheets

(56)          References Cited

OTHER PUBLICATIONS

Yunzhao Nie, Woogeun Rhee and Zhihua Wang, An IEEE 802.15.4/4z Coherent Quadrature Hybrid Correlation UWB Receiver in 65-nm CMOS, IEEE Journal of Solid-State Circuits, vol. 59, No. 8, Aug. 2024 (Year: 2024).*

Yunzhao Nie, Woogeun Rhee, and Zhihua Wang, A 17.3mW IEEE 802.15.4/4z Coherent Quadrature Hybrid Correlation UWB Receiver in 65nm CMOS, Tsinghua University, Beijing, China, IEEE, 2023 (Year: 2023).*

Amin Pourvali Kakhki, Mohammad Taherzadeh-Sani and Frederic Nabki, An Energy Efficient Coherent IR-UWB Receiver With Non-Coherent-Assisted Synchronization, IEEE Transactions on Circuits and Systems-I: Regular Papers, vol. 70, No. 8, Aug. 2023 (Year: 2023).*

Sudabeh Fotoohi Piraghaj and Saeed Saeedi, Analysis of Timing Accuracy and Sensitivity in a RF Correlation-Based Impulse Radio Receiver With Phase Interpolation for Data Synchronization, IEEE Transactions on Circuits and Systems-I: Regular Papers, vol. 66, No. 7, Jul. 2019 (Year: 2019).*

Marian Verhelst and Wim Dehaene, A Flexible, Ultra-Low-Energy 35 pJ/Pulse Digital Back-End for a QAC IR-UWB Receiver, IEEE Journal of Solid-State Circuits, vol. 43, No. 7, Jul. 2008 (Year: 2008).*

3db., "Impulse Radio UWB Principles and Regulation" Published Dec. 11, 2019.

Yong Shi., "High Rate Pulse Ultrawideband Physical Layer Testing and Certification" Published in 2021.

Dipl.-Ing. Bernhard Großwindhager, BSc, "Robust, Efficient, and Scalable UWB-based Positioning using Multipath and Quasi-simultaneous Transmissions" Published Jun. 2020.

Seyed Mohammad-Sajad Sadough., "A Tutorial on Ultra Wideband Modulation and Detection Schemes" Published Apr. 2009.

* cited by examiner

600

610

DE-SPREAD RECEIVED UWB SIGNAL BASED ON FIRST BIT VALUE TO GENERATE FIRST MAGNITUDE VALUE

620

DE-SPREAD RECEIVED UWB SIGNAL BASED ON SECOND BIT VALUE TO GENERATE SECOND MAGNITUDE VALUE

630

COMPARE FIRST MAGNITUDE VALUE TO SECOND MAGNITUDE VALUE

640

OUTPUT BIT VALUE BASED ON THE COMPARISON

DUAL-PHASE AND IMPULSE BASED ULTRA-WIDEBAND ARCHITECTURE

FIELD

The present disclosure relates generally to the field of processors and in particular to processors for ultra-wideband (UWB) signals

BACKGROUND

Ultra-wideband signals are well suited for secure ranging techniques because these signals enable accurate distance measurement between devices.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
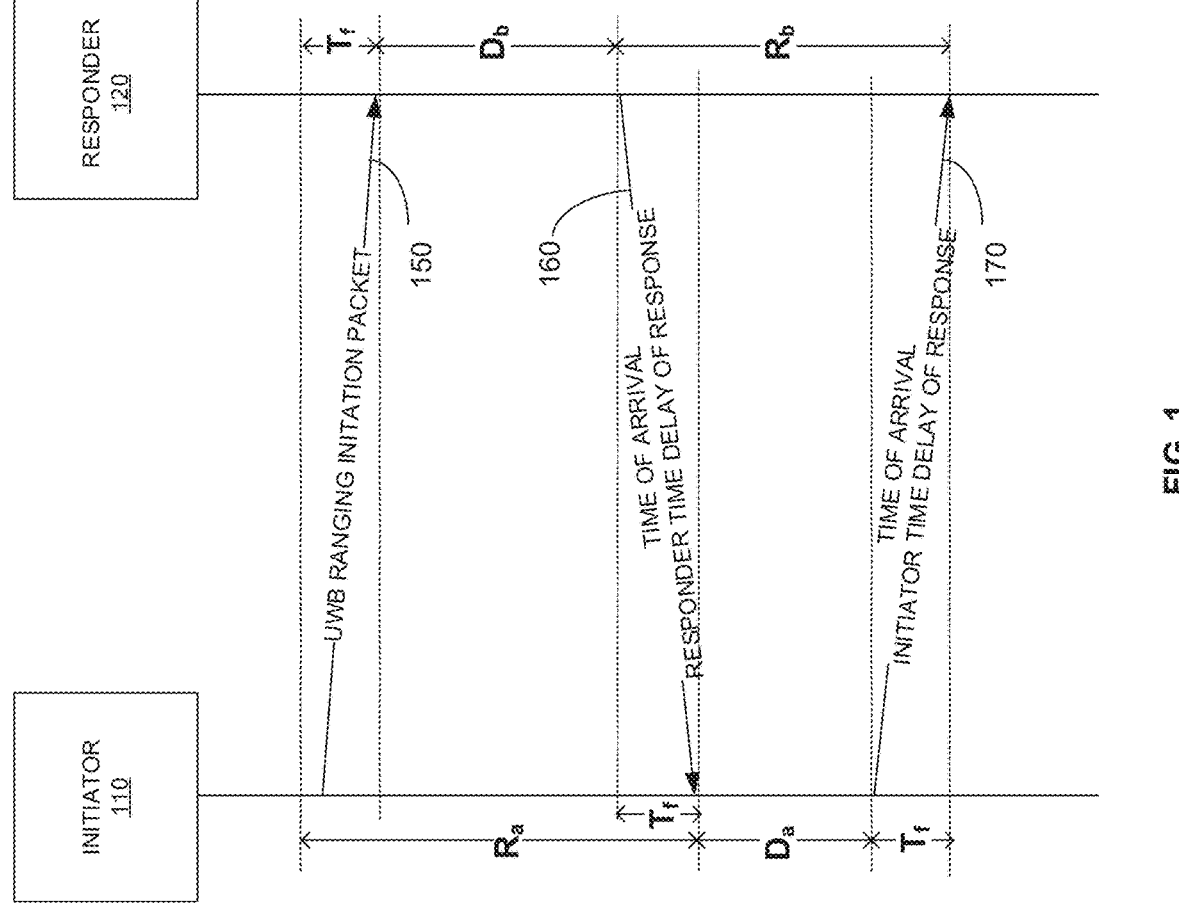
FIG. 1 illustrates an example ranging process.

The present disclosure is described with reference to the attached figures. Similar components in various figures may be represented by similar reference characters. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Ranging is the process of precise detection of the distance between an initiator device and a responder device. For example, ranging may be performed to determine the distance between a portable device (e.g., a smart phone, key fob, or tag) and a control unit, which may installed in a vehicle or in a fixed geographic location. Various portions of this disclosure will identify some devices as initiator devices with other devices being identified as responder devices. It is to be understood that any type of device may perform the role of initiator device or responder device.

In some application scenarios, when the distance between the initiator device and the responder device is within a pre-specified limit, some form of authorization, usually in the form of physical access, such as unlocking a door, may be performed by the primary device. Other applications of ranging include inventory tracking, navigation in indoor settings, and device location services.

Ultra-wideband (UWB) radio technology has seen increased adoption in secure ranging due to the waveform's ability to support accurate time of flight estimation and therein a determination of relative position. UWB signals are a train of impulses that transmit information using patterns of pulses. Each pulse is very narrow, typically less than two nanoseconds, and occupies a wide frequency band. This means the pulse has a rising edge that is very steep which allows the receiver of the pulse to very accurately measure the arrival time of the signal. UWB pulses can be distinguished even in noisy environments, and the pulses are more resistant to multipath effects than narrowband signals. Due to the strict spectral mask of UWB signals, the transmit power lies at the noise floor, which means that UWB signals do not interfere with other radio communication systems operating in the same frequency bands.

UWB secure ranging solutions may follow the IEEE 802.15.4z ranging standard, which was finalized in 2020. This standard enhanced the existing IEEE802.154a ranging standard with new integrity features, allowing more precise and secure ranging. Another relevant standard is the Car Connectivity Consortium CCC standard which provides an industry standard for secure ranging between UWB devices installed in automobiles and devices such as smartphones.

FIG. 1 illustrates an example of two-way ranging (TWR) process in which an initiator device 110 (referred to as "the initiator" for brevity) determines its line-of-sight distance from a responder device 120 (referred to as "the responder" for brevity). The distance is determined based on the time it takes a UWB signal transmitted by the initiator device to reach the responder device. This basic TWR process is the foundation of many different ranging and positioning applications. For example, the initiator device 110 may perform TWR with at least three other responder devices and use triangulation to determine its position with respect to the other devices.

To begin, the initiator sends a UWB signal carrying a ranging initiation packet 150 to the responder. When a defined portion of the packet leaves the initiator's antenna, the initiator starts its roundtrip timer $R_a$. This timer will be stopped when the reply from the responder is received. The time the packet takes to reach the responder is called the time of flight $T_f$. $T_f$ may be on the order of tens of nanoseconds. Upon receiving the ranging initiation packet, the responder calculates the time of arrival (ToA) of the packet at its antenna and then constructs an acknowledgement packet 160. This acknowledgement packet includes the ToA of the ranging initiation packet 150 as well as the time delay $D_b$ between when the ranging initiation packet 150 was received by the responder and when the responder transmits the UWB signal carrying the acknowledgement packet 160. When the responder transmits the acknowledgment packet 160, the responder may starts its own roundtrip timer $R_b$.

In many cases $D_b$ is several orders of magnitude larger than $T_f$. The length of the packets 150 and 160 is usually on the order of hundreds of microseconds. The processing speed of the initiator or the responder will determine how fast the time of arrival can be calculated and encoded in an acknowledgement packet. Using current generation devices, $D_b$ will also be on the order of hundreds of microseconds.

When the initiator receives the acknowledgement packet 160, it stops its roundtrip timer to determine the roundtrip time $R_a$ of the ranging round. Once the responder has decoded the acknowledgement packet 160, it may determine $T_f = (R_a - D_b)/2$.

Since both devices have their own independent and unsynchronized clocks, both devices are affected by imperfections in their timing references. Double sided two way ranging reduces the impact of clock drift by including an additional ranging exchange between the devices. In double sided two way ranging, upon receiving the acknowledgement packet 160 the initiator transmits a UWB signal encoding an additional packet 170 to the responder. The additional packet 170 informs the responder about the ToA of the acknowledgment packet 160 and the time delay $D_a$ between when the acknowledgment packet 160 was received by the initiator and when the initiator transmits the UWB signal carrying the additional packet 170. With the additional information of $D_a$, $T_f$ (which is assumed to be equal in every round) may be calculated as $(R_a-D_a+R_b-D_b)/4$. This improved $T_f$ may be provided to the initiator. It can be seen that the processing time of both the initiator and responder are factors in this determination of $T_f$, reducing the error introduced due to any clock offset between the initiator and responder.

IEEE 802.15.4z standardizes two modes of ranging operation: Low-Rate Pulse (LRP) and High-Rate Pulse (HRP). Packet formats, implementation, and security of LRP and HRP differ. To limit interference, regulators restrict the output power of UWB receivers in proportion to their communication rate. Under these regulations, as the pulse rate increases, the maximum allowed transmission power per pulse should decrease. LRP pulses may therefore be transmitted at a higher power than HRP pulses, and in many scenarios individual LRP type pulses can be detected and decoded by the receiver.

In contrast, due to the lower transmission power of an HRP type pulse, in many application scenarios individual HRP type pulses may not be detectable by the receiver. HRP mode thus requires that the energy is split up into many pulses to transmit information successfully. The security concept of HRP reflects the fact that HRP type pulses are low power and to enhance security, HRP type pulses encode what is referred to as a random secure training sequence, a scrambled time sequence, or a scrambled timestamp sequence (referred to interchangeably as STS). The STS may be up to 4096 HRP pulses long. The receiver detects the STS through autocorrelation with a stored reference STS template. Typically, one of the correlation peaks is used to determine the time of arrival of the packet. Contrary to LRP where the polarity of each pulse is detected, HRP receivers determine the time of arrival (ToA) of a transmitted UWB STS signal based on an aggregation of received pulses.

The HRP UWB Enhanced ranging device (ERDEV) communication protocol specifies UWB communication based on physical layer (PHY) protocol data unit (PPDU) frames. Each PPDU frame may include a synchronization header (SHR), a physical layer header (PHR), physical layer service data unit (PSDU) carrying the data payload, and the STS. The PHR conveys information used by the receiver for decoding the payload such as, for example, data rate, frame length, preamble length, and a Hamming block code that enables correction of a single error and detection of two errors (SECDED) in the decoded signal. The PSDU is the PHY payload. The payload, may include, for example, location data, sensor data, control commands, device status, device identification, and so on, depending on the use case and application.

In the UWB signal, the PHR and PSDU bits may be separately encoded using SECDED encoding for the PHR bits and Reed-Solomon encoding for the PSDU bits. The encoded PHR and PSDU bits are subject to further convolutional encoding. The resulting bits are modulated using burst position modulation (BPM)—binary phase shift keying (BPSK) modulation into a symbol.

Figures 2, 3:
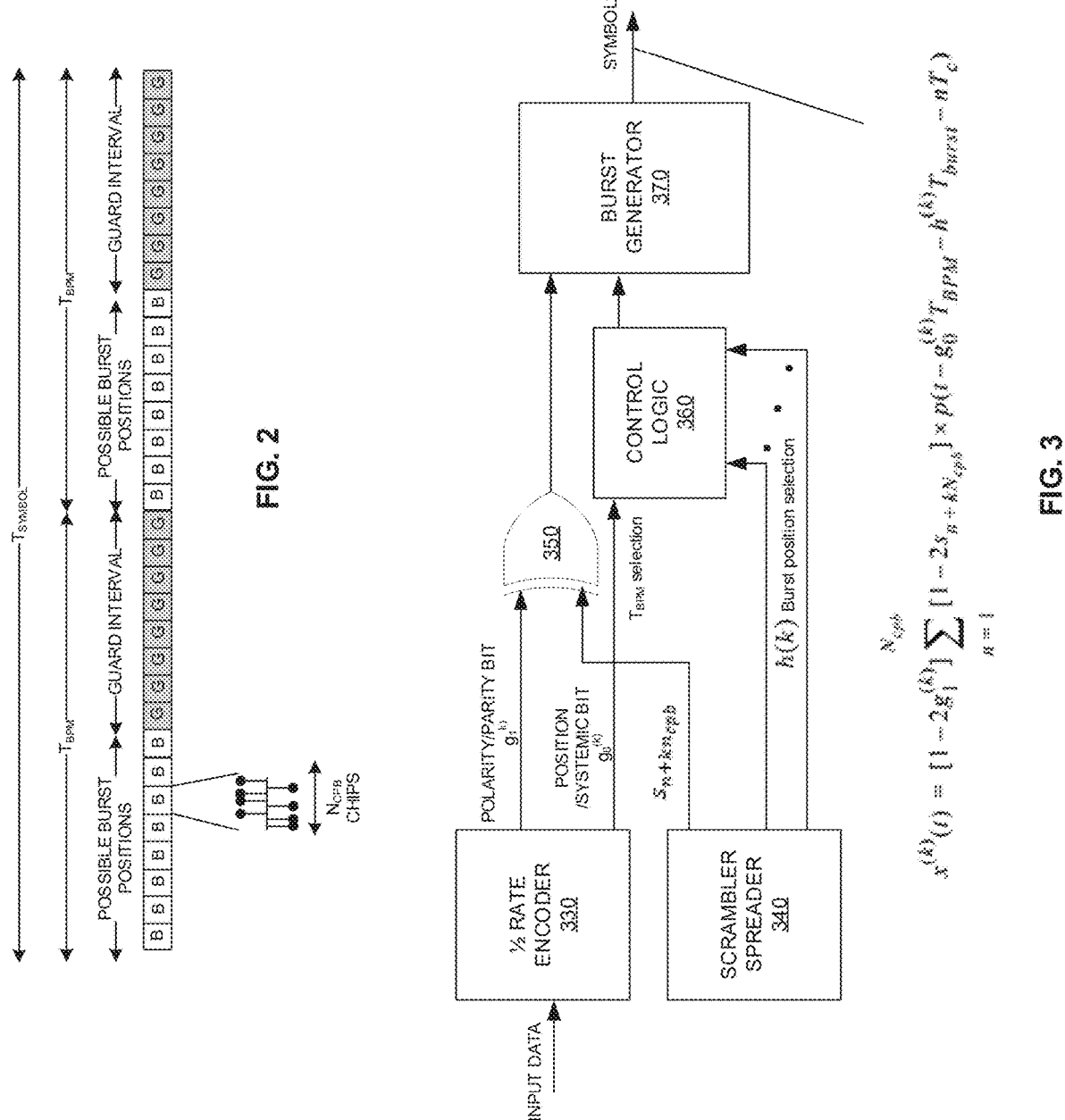
FIG. 2 illustrates an example ultra-wideband (UWB) symbol.
FIG. 3 illustrates an example encoding and modulation process for UWB symbols.

An example BPM-BPSK symbol is illustrated in FIG. 2. The symbol is divided into two BPM intervals ($T_{BPM}$). Each BPM interval is divided into two halves. A BPM interval includes several burst positions, designated B in FIG. 2, in the first half of each BPM interval with the second half of each BPM interval serving as a guard interval (indicated by positions labeled G) during which bursts are not permitted. The BPM interval in which the burst is located encodes either a 0 or 1. For example, in some BPM modulation schemes when the burst is in the first BPM interval, the encoded value corresponds to a 0 and when the burst is in the second BPM interval, the encoded value corresponds to a 1.

As discussed above, a symbol is repeated a number of times in the UWB signal and the receiving device accumulates the repeated symbols to obtain sufficient energy for decoding. In some examples, the UWB signal repeats each symbol 512 times. Each symbol includes a burst located at a particular (time) position in the symbol. A burst is a series of impulses of either 1 or −1. The number of impulses or "chips" in a burst ($N_{CPB}$) is defined by a chip rate for the modulation scheme. $N_{CPB}$ is 8 in the symbol illustrated in FIG. 2. The polarity of the chips may be chosen in such a way that the spectrum of the transmitted waveform is smoothed. The use of multiple chips to encode a single bit value spreads the UWB signal and provides interference suppression.

In each symbol, the burst is transmitted in only one of the burst positions. The burst position for a given transmitter can vary on a symbol-to-symbol basis following a time hopping code. The use of a time hopping code provides resistance to multi-user interference in cases where all users have their own time hopping code.

FIG. 3 illustrates a process that may be used to generate UWB symbols, such as the symbol shown in FIG. 2, that carry PHR and PSDU bits. The transmit waveform during the $k^{th}$ symbol interval may be expressed according the equation shown in FIG. 3. In the equation, k identifies a particular symbol interval. For example, in the symbol of FIG. 2 has two intervals. n identifies a particular chip of the sequence of chips (having a value of either 1 or −1) into which the encoded value is spread as illustrated in FIG. 2. $h(k)\in\{0,1-N_{hop}-1\}$ is a burst hopping sequence that defines which burst position in the symbol will carry the signal. $p(t)$ is the transmitted pulse shape at the antenna. Different burst hopping sequences may be assigned to different user devices to provide multiuser interference suppression. In general, the first half of the equation controls the polarity of a given chip while the second half of the equation controls in which burst position the chip is transmitted. No signal is transmitted in remaining burst positions of the signal.

For each PHR or PSDU bit, a half rate encoder 330 generates a polarity/parity bit $g_1^{(k)}$ and a position/systemic bit $g_0^{(k)}$. The position/systemic bit is provided to control logic circuitry 350 to cause the control logic circuitry 350 to select either the first or second $T_{BPM}$ interval (depending on the value of $g_0^{(k)}$). Scrambler/spreader circuitry 340 provides a particular scrambling sequence or code $s_{n+kn_{cpb}}\in\{0,1\}$ to circuitry 350 that generates a sequence of chips based on the parity bit and the scrambling sequence as set forth in the first half of the equation of FIG. 3. The scrambler/spreader circuitry 340 also provides a particular burst hopping sequence h(k) associated with the particular transmitter to control logic 360 to cause the control logic to select the appropriate burst position within the selected symbol interval as per the second half of the equation of FIG. 3. The second half of the equation of FIG. 3 will have a value of 0 except during the selected burst interval.

Figure 4:
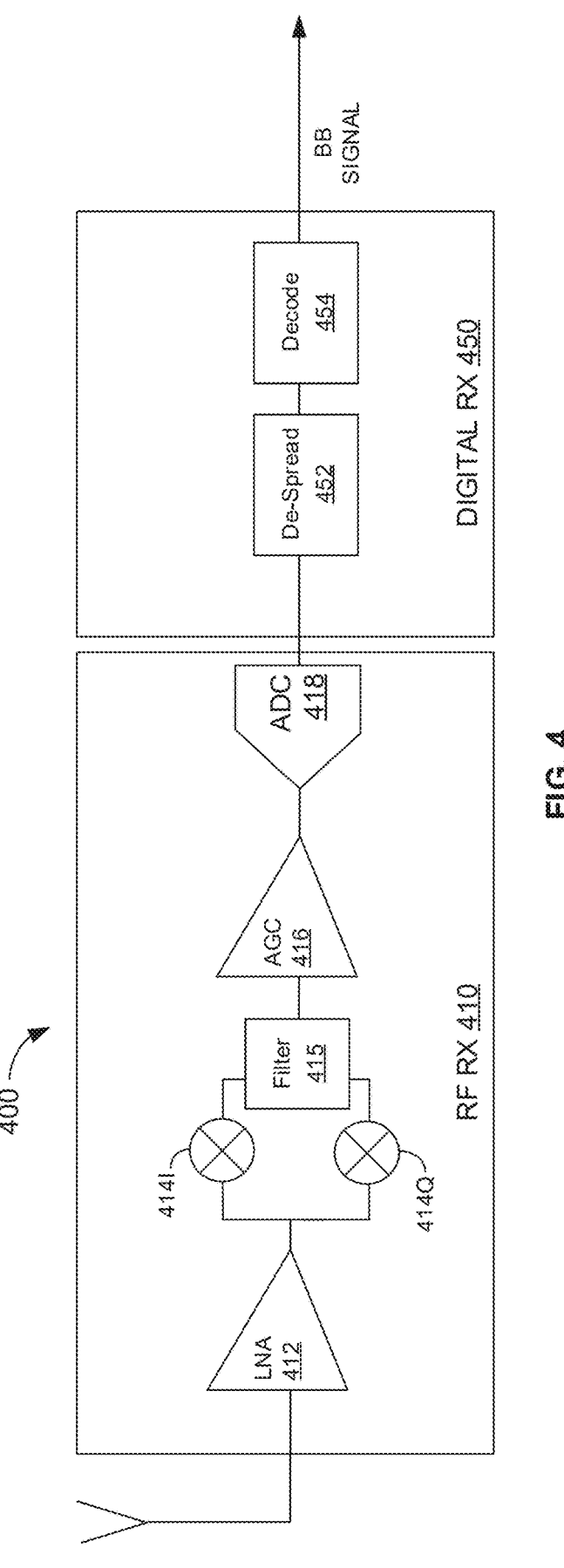
FIG. 4 illustrates an example UWB receiver, in accordance with various aspects described.

FIG. 4 illustrates an example UWB receiver 400 that recovers the UWB signal envelope for decoding purposes. The UWB receiver includes a radio frequency (RF) front end 410 and a digital receiver 450. The RF front end 410 includes a low noise amplifier 412 that amplifies a received signal and mixer circuitry 414I, 414Q that down-converts the amplified received signal to baseband frequency. Filter 415 filters the I component and Q component of the down-converted signal and the filtered I and Q components are combined. The magnitude of the resulting signal is amplified or attenuated based on automatic gain control amplifier 416. An analog-to-digital converter (ADC) 418 converts this signal to a digital signal, which is provided to the digital receiver.

The digital receiver 450 includes de-spreading circuitry 452 that de-spreads the digital UWB signal and decoding circuitry 454 that decodes the de-spread signal to generate a digital baseband signal. The decoding circuitry 454 may include several different stages of decoding, such as, for example, Viterbi decoding, SECDED decoding, Reed-Solomon decoding, and/or other types of decoding.

Recall that the UWB signal consists of low energy pulses that may lie beneath the noise floor. This makes UWB signals susceptible to interference and co-existence issues with other wireless technologies in the same spectrum, such as Wi-Fi. The UWB receiver 400 may not be able to satisfactorily receive UWB signals in a noisy environment for several reasons. For example, when an interfering signal, such as a Wi-Fi signal, is present in the same RF band as the UWB carrier, the ADC 418 may not have sufficient dynamic range or resolution to capture a UWB signal that is at or near the noise floor. Some receivers employ higher resolution ADCs, but as spectrum becomes more crowded and interfering signals are more likely to be present, UWB signals may in fact below the noise floor, meaning that even higher resolution ADCs may become saturated by interfering signals.

Another disadvantage to the UWB receiver of FIG. 4 is that the de-spreading operation is performed on the signal magnitude only (combined I and Q components) and cannot be performed in real-time. This means that synchronization and timing alignment advantages of UWB HRP are lost. Further, the de-spreading, which takes place in the digital domain, is performed on the digital signal output by an ADC which may be saturated by noise, degrading the receiver's ability to detect the UWB signal within the noisy digital signal produced by the ADC 418.

Figure 5:
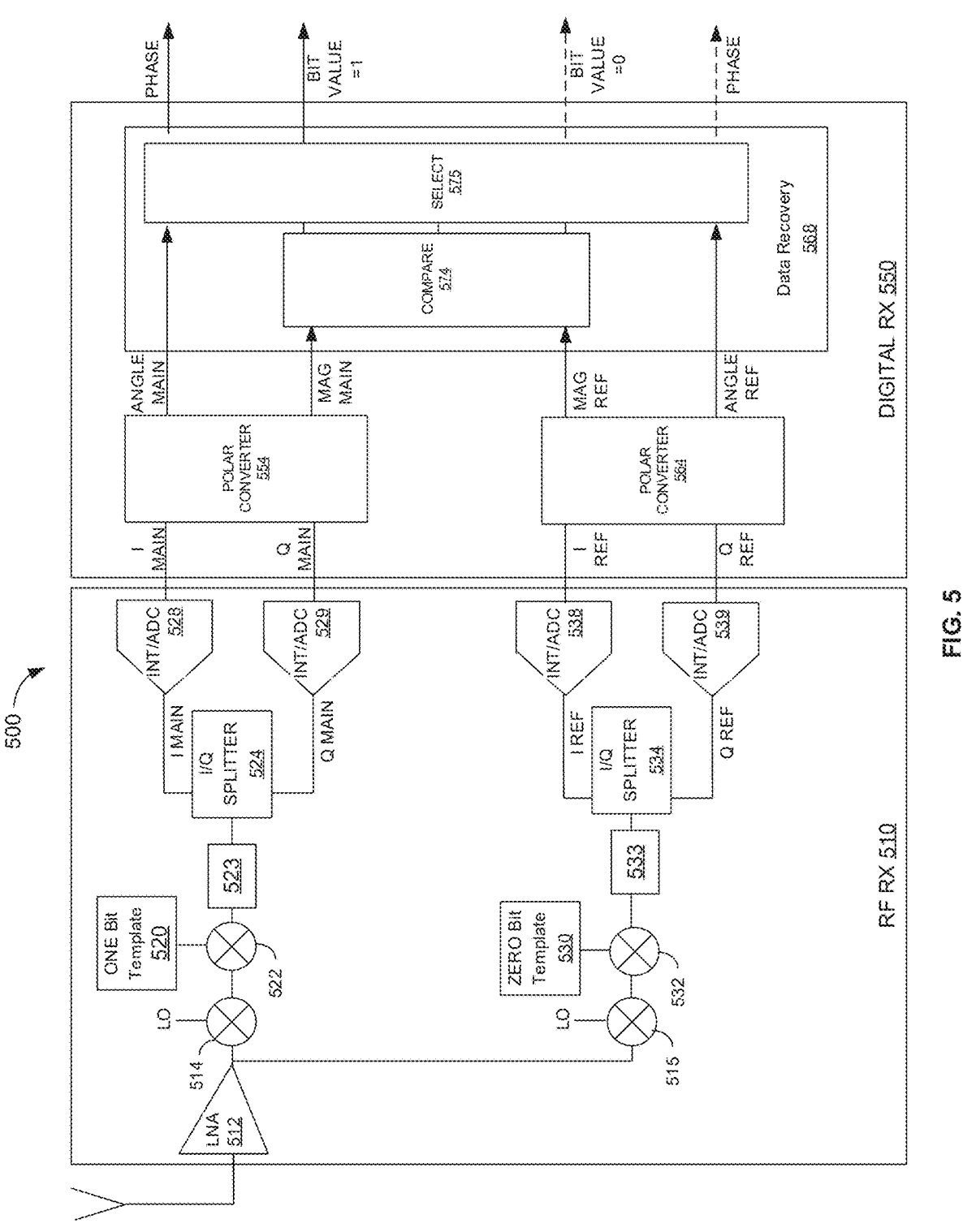
FIG. 5 illustrates an example UWB receiver, in accordance with various aspects described.

FIG. 5 illustrates an example UWB receiver 500 that provides improved UWB signal detection in noisy environments and preserves phase information of the UWB signal to support phase modulation of UWB signals to increase data rates.

The receiver 500 includes an RF front end 510 and a digital receiver 550. The received signal is amplified by low noise amplifier 512 and the filtered signal is provided to two parallel processing paths, a main path that de-spreads based on a 1 bit value and a reference path that de-spreads based on a 0 bit value. The main path includes down-converter circuitry 514 that down-converts the received signal to baseband frequency. The down-converted signal is then de-spread based on a 1 bit value template 520 by de-spreading circuitry 522. The 1 bit value template may be stored in the receiver when the receiver's intended ranging partner device (e.g., a key fob) is paired with the receiver.

In some examples, the 1 bit value template includes a sequence of +1 or −1 values that correspond to the chip values applied in the coding process shown in FIG. 3 to generate the UWB burst. For example, assuming that FIG. 2 illustrates a symbol encoding a 1 bit value, the 1 bit value template 520 would include the values [−1 −1 +1 −1 +1 +1 −1 +1]. The 1 bit value template 520 may include a number of repetitions of the 1 bit value sequence that corresponds to the repetition rate of the UWB signal. For example if the bit is made of 512 symbols then the template 520 includes 512 symbol sequences for the 1 bit value.

Within the template, the 1 bit value sequences for successive symbols are separated by 0s to position each 1 bit value sequence, within each symbol, in the BPM interval assigned to a 1 bit value and also in the specific burst position assigned to the transmitter. Other de-spreading templates and/or techniques may be used. In some examples, the de-spreading circuitry 522 multiplies the received signal with the template to generate a de-spread signal that carries either the repeated 1 bit value sequence separated by 0s (when the UWB symbol corresponds to a 1) or noise (when the UWB symbol corresponds to a 0).

Similarly, in the reference path, after down-conversion circuitry 515 down-converts the received signal, de-spreader circuitry 532 de-spreads the received signal based on a 0 bit value template 530. The 0 bit value template may be stored in the receiver when the receiver's intended ranging partner device (e.g., a key fob) is paired with the receiver. The 0 bit value template includes 0 bit value sequences of +1 and −1 values corresponding to the chip values used to generate a UWB burst separated by 0s to position the 0 bit value sequences within the appropriate BPM interval and burst position. The de-spread signal carries either the repeated 0 bit value sequence separated by 0s (when the UWB symbol corresponds to a 0) or noise (when the UWB symbol corresponds to a 1).

The de-spread signal of the main path is rectified by rectifier circuitry 523 so that signal components having a negative value are inverted to a corresponding positive value. Similarly, in the reference path, the de-spread signal is rectified by rectifier circuitry 533 and provided to an I/Q splitter 534 that separates the de-spread signal into an I reference component and a Q reference component. The de-spread signals output by circuitries 523, 533 correspond to either a value approaching 8 (i.e., the number of chips) which indicates perfect correlation between the template and the received signal, or noise. This means that the required dynamic range of the integrator/ADCs 528, 529, 538, 539 is significantly reduced.

In the main path, the rectified signal is provided to an I/Q splitter 524 that separates the de-spread signal into an I main component and a Q main component. The integrator/ADC 528 sums the I main component over a symbol period and the integrator/ADC 529 sums the Q main component over a symbol period. At the end of the symbol period, the integrator/ADCs 528, 529 output a digital I main value and digital Q main value, respectively. A polar converter 554 converts the digital I main value and digital Q main value into a main magnitude value and a main angle value. These values are provided to data recovery circuitry 568.

In the reference path, the integrator/ADC 538 sums the I reference component over a symbol period and the integrator/ADC 539 sums the Q reference component over a symbol period. At the end of the symbol period, the integrator/ADCs 538, 539 output a digital I reference value and digital Q reference value, respectively. A polar converter 564 converts the digital I reference value and digital Q reference value into a reference magnitude value and a reference angle value. These values are provided to the data recovery circuitry 568.

When the symbol corresponds to a 1, the main magnitude value should significantly exceed the reference magnitude value because of the de-spreading performed by de-spreading circuitries 522, 532. When the symbol corresponds to a 0, the reference magnitude value should significantly exceed the main magnitude value because of the de-spreading performed by de-spreading circuitries 522, 532. Comparison circuitry 574 compares the main magnitude value with the reference magnitude value. When the main magnitude value exceeds the reference magnitude value the comparison circuitry 574 outputs a bit value of 1. When the reference magnitude value exceeds the main magnitude value the comparison circuitry 574 outputs a bit value of 0. Selection circuitry 575 outputs either a bit value of 1 or 0 as determined by the comparison circuitry 574.

In addition to decoding the bit value, a phase associated with the bit value may be recovered as follows. Depending on the output of the comparison circuitry 574, selection circuitry 575 selects either the main angle value (e.g., output by converter 554) or the reference angle value (e.g., output by converter 564) for output as a phase associated with the bit value. For example, when main magnitude value exceeds the reference magnitude value, the selection circuitry 575 selects and outputs the main angle value. In this manner, the data recovery circuitry 568 outputs a bit value of 1 or 0 and (optionally) an associated phase.

Recovery of the phase information by the receiver enables phase modulation to be used in UWB signals. For example, different transmitters may be assigned different phase values based on the number of transmitters. Phase modulation may be used to encode additional information bits in other examples.

Figure 6:
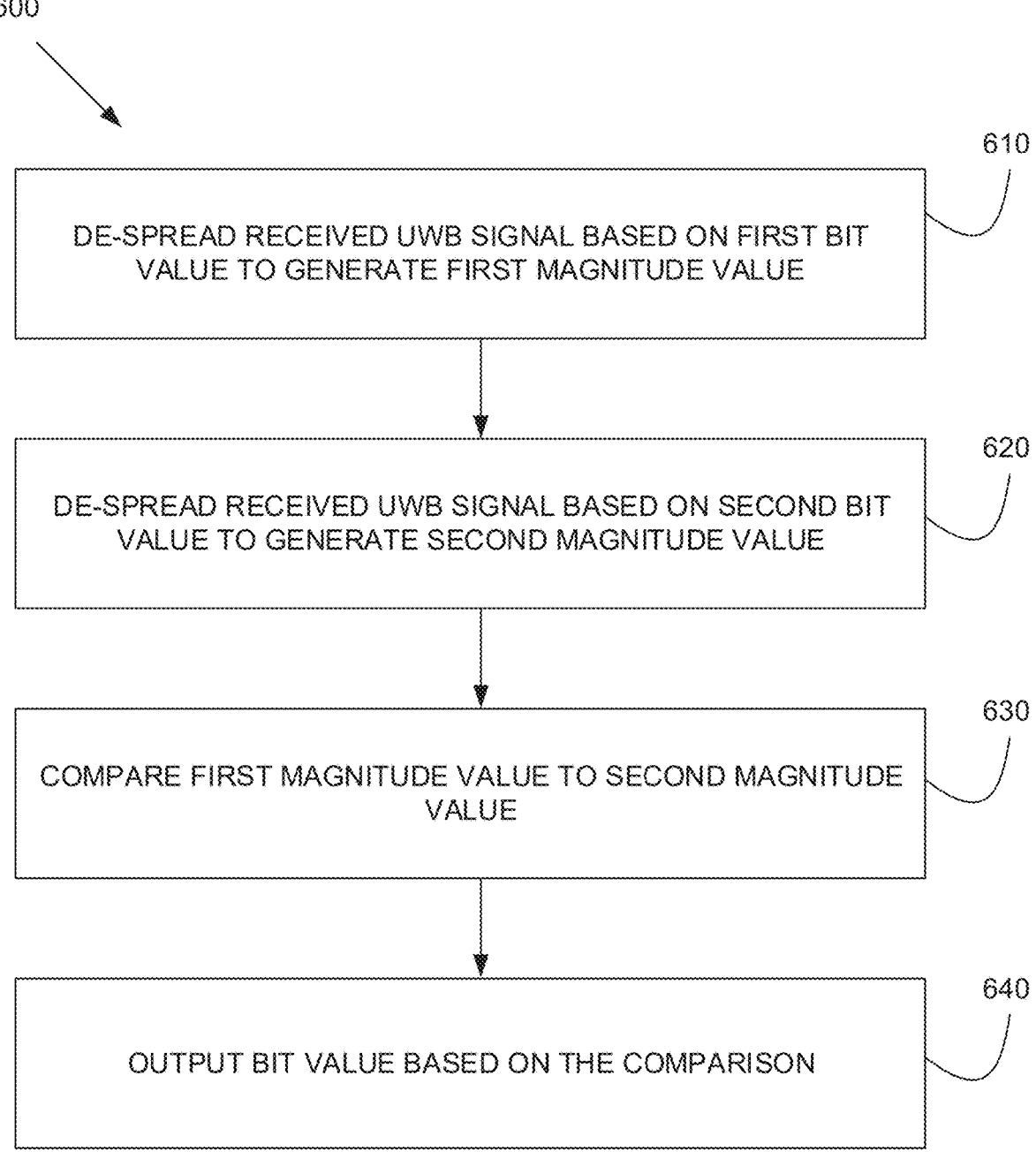
FIG. 6 is a flow diagram of a method for processing a received UWB signal, in accordance with various aspects described.

FIG. 6 is a flow diagram outlining an example method 600 for processing a received UWB signal. The method may be performed, for example, by a UWB receiver such as the receiver illustrated in FIG. 5. The method includes, at 610, de-spreading a received UWB signal based on a first bit value to generate a first magnitude value. This de-spreading operation may be performed by one of two parallel processing paths. At 620, the received UWB signal is de-spread based on a second bit value to generate a second magnitude value. This de-spreading operation may be performed by a second of the two parallel processing paths. Steps 610 and 620 may be performed in parallel by separate processing components in some examples. However, in other examples, steps 610 and 620 may be performed sequentially.

The method includes, at 630, comparing the first magnitude value to the second magnitude value. This comparison may be performed, for example, by comparison circuitry 574 of FIG. 5. At 640, a bit value is output based on the comparison. The bit value may be either the first bit value of 610 or the second bit value of 620.

In some examples, the method may include determining the first magnitude value and the second magnitude value by performing the following steps in first and second processing paths. The steps include splitting a de-spread received UWB signal into a I component and a Q component (see, e.g., I/Q splitters 524, 534 of FIG. 5); summing the I component over a symbol period and output a digital I component (see, e.g., integrator/ADCs 528, 538 of FIG. 5); summing the Q component over a symbol period and output a digital Q component (see, e.g., integrator/ADCs 529, 539 of FIG. 5); and converting the digital I component and the digital Q component to a magnitude value (see, e.g., polar converters 554, 564 of FIG. 5).

In some examples, the method may include de-spreading the received UWB signal based on the first bit value by multiplying the received UWB signal with a first template associated with the first bit value; and de-spreading the received UWB signal based on the second bit value by multiplying the received UWB signal with a second template associated with the second bit value. The multiplying may be performed by multipliers 522, 532 of FIG. 5. The first template and the second template may include respective bit value sequences of +1 and −1 values based on a coding scheme. The bit value sequences may be separated by 0 values to position the bit value sequence within a selected BPM interval and a selected burst position of the symbol period.

In some examples, the de-spread received UWB signals may be rectified prior to integrating (see, e.g., circuitries 523, 533 of FIG. 5).

In some examples, the method includes converting the de-spread received UWB signal based on the first bit value into the first magnitude value and a first phase value; and converting the de-spread received UWB signal based on the second bit value into the second magnitude value and a second phase value (see, e.g., polar converters 554, 564 of FIG. 5 which output an angle or phase value). The method may include, outputting a bit value of 1 and the first phase value in response to the first magnitude value exceeding the second magnitude value or outputting a bit value of 0 and the second phase value in response to the second magnitude value exceeding the first phase value.

In some examples, the method includes determining a value of a second bit or information that identifies a transmitter of the received UWB signal based on the output phase value.

It can be seen that the parallel de-spreading for 1 bit value and 0 bit value and subsequent selection of either the main path output or the reference path output enables real-time decoding of the UWB signal with phase information intact.

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term indicate when used with reference to some entity (e.g., parameter or setting) or value of an entity is to be construed broadly as encompassing any manner of communicating the entity or value of the entity either explicitly or implicitly. For example, bits within a transmitted message may be used to explicitly encode an indicated value or may encode an index or other indicator that is mapped to the indicated value by prior configuration. The absence of a field within a message may implicitly indicate a value of an entity based on prior configuration.

As used herein, the term provide when used with reference to information or data or a signal encoding data is to be construed broadly as encompassing any manner of communicating the information, data, or signal encoding data either explicitly or implicitly. "Provide" should be construed to encompass transmitting a message that indicates the information or data, storing the information or data in memory accessible to the recipient of the providing, controlling electrical signals on conductors in a circuit to encode the information or data, and so on.

As used herein, the term obtain when used with reference to information or data or a signal encoding data is to be construed broadly as encompassing any manner of receiving the information, data, or signal encoding data either explicitly or implicitly. "Obtain" should be construed to encompass receiving a message that indicates the information or data, reading the information or data from memory, performing computations or processing on other data to obtain the information or data, detecting electrical signals on conductors in a circuit detect the information or data, and so on.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to provide safety management on a per-application group basis according to embodiments and examples described herein.

EXAMPLES

Example 1 is an ultra-wideband (UWB) receiver, including a first processing path including first de-spreading circuitry that de-spreads a received UWB signal based on a first bit value to generate a first magnitude value; a second processing path including second de-spreading circuitry that de-spreads the received UWB signal based on a second bit value to generate a second magnitude value; and data recovery circuitry configured to compare the first magnitude value to the second magnitude value; and output a bit value based on the comparison.

Example 2 includes the subject matter of example 1, including or omitting optional elements, wherein the first processing path and the second processing path each include I/Q splitter circuitry configured to split a signal output by the de-spreading circuitry into a I component and a Q component; I component integrator/analog-to-digital converter (ADC) circuitry configured to sum the I component over a symbol period and output a digital I component; Q component integrator/ADC circuitry configured to sum the Q component over a symbol period and output a digital Q component; and a polar converter configured to convert the digital I component and the digital Q component to a magnitude value.

Example 3 includes the subject matter of example 1, including or omitting optional elements, wherein the first de-spreading circuitry is configured to multiply a first template with the received UWB signal; and the second de-spreading circuitry is configured to multiply a second template with the received UWB signal.

Example 4 includes the subject matter of example 3, including or omitting optional elements, wherein the first template and the second template include respective bit value sequences of +1 and −1 values based on a coding scheme.

Example 5 includes the subject matter of example 4, including or omitting optional elements, wherein in each of the first template and the second template, the bit value sequences are separated by 0 values to position the bit value sequence within a selected BPM interval and a selected burst position of a symbol period.

Example 6 includes the subject matter of example 1, including or omitting optional elements, further including in the first processing path, first rectifier circuitry configured to rectify a signal output by the first de-spreading circuitry; and in the second processing path, second rectifier circuitry rectify a signal output by the second de-spreading circuitry.

Example 7 includes the subject matter of example 1, including or omitting optional elements, wherein the first processing path includes a first polar converter that converts a signal output by the first de-spreading circuitry into the first magnitude value and a first phase value; and the second processing path includes a second polar converter that converts a signal output by the second de-spreading circuitry into the second magnitude value and a second phase value.

Example 8 includes the subject matter of example 7, including or omitting optional elements, wherein the data recovery circuitry is configured to output a bit value of 1 and the first phase value when the first magnitude value exceeds the second magnitude value and output a bit value of 0 and the second phase value when the second magnitude value exceeds the first magnitude value.

Example 9 is a method, including de-spreading a received UWB signal based on a first bit value to generate a first magnitude value; de-spreading the received UWB signal based on a second bit value to generate a second magnitude value; and comparing the first magnitude value to the second magnitude value; and outputting a bit value based on the comparison.

Example 10 includes the subject matter of example 9, including or omitting optional elements, further including determining the first magnitude value and the second magnitude value by, in first and second processing paths, splitting a de-spread received UWB signal into a I component and a Q component; summing the I component over a symbol period and output a digital I component; summing the Q component over a symbol period and output a digital Q component; and converting the digital I component and the digital Q component to a magnitude value.

Example 11 includes the subject matter of example 9, including or omitting optional elements, including de-spreading the received UWB signal based on the first bit value by multiplying the received UWB signal with a first template associated with the first bit value; and de-spreading the received UWB signal based on the second bit value by multiplying the received UWB signal with a second template associated with the second bit value.

Example 12 includes the subject matter of example 11, including or omitting optional elements, wherein the first template and the second template include respective bit value sequences of +1 and −1 values based on a coding scheme.

Example 13 includes the subject matter of example 12, including or omitting optional elements, wherein in each of the first template and the second template, the bit value sequences are separated by 0 values to position the bit value sequence within a selected BPM interval and a selected burst position of a symbol period.

Example 14 includes the subject matter of example 9, including or omitting optional elements, further including rectifying a de-spread received UWB signal.

Example 15 includes the subject matter of example 9, including or omitting optional elements, further including converting the de-spread received UWB signal based on the first bit value into the first magnitude value and a first phase value; and converting the de-spread received UWB signal based on the second bit value into the second magnitude value and a second phase value.

Example 16 includes the subject matter of example 15, including or omitting optional elements, further including in response to the first magnitude value exceeding the second magnitude value, outputting a bit value of 1 and the first phase value; and in response to the second magnitude value exceeding the first phase value, outputting a bit value of 0 and the second phase value.

Example 17 includes the subject matter of example 16, including or omitting optional elements, including determining information that identifies a transmitter of the received UWB signal based on the output phase value.

Example 18 includes the subject matter of example 16, including or omitting optional elements, including determining a value of a second bit encoded in the received UWB signal based on the output phase value.

Example 19 is an ultra-wideband (UWB) receiver, including: de-spreading circuitry that de-spreads a received UWB signal based on a template to generate a de-spread received UWB signal; I/Q splitter circuitry configured to split de-spread received UWB signal into a I component and a Q component; I component integrator/analog-to-digital converter (ADC) circuitry configured to sum the I component over a symbol period and output a digital I component; Q component integrator/ADC circuitry configured to sum the Q component over a symbol period and output a digital Q component; and a polar converter configured to convert the digital I component and the digital Q component to a magnitude value and a phase value.

Example 20 includes the subject matter of example 19, including or omitting optional elements, wherein the template includes respective bit value sequences of +1 and −1 values based on a coding scheme.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example A or B is to be construed as include only A, only B, and both A and B. Further the phrase "one or more of" followed by A, B, or C is to be construed as including A, B, C, AB, AC, BC, and ABC.

What is claimed is:

1. An ultra-wideband (UWB) receiver, comprising:
   a first processing path comprising first de-spreading circuitry that de-spreads a received UWB signal based on a first bit value to generate a first magnitude value;
   a second processing path comprising second de-spreading circuitry that de-spreads the received UWB signal based on a second bit value to generate a second magnitude value; and
   data recovery circuitry configured to
      compare the first magnitude value to the second magnitude value; and
      output a bit value based on the comparison.

2. The UWB receiver of claim 1, wherein the first processing path comprises:

I/Q splitter circuitry configured to split a signal output by the first de-spreading circuitry into a I component and a Q component;

I component integrator/analog-to-digital converter (ADC) circuitry configured to sum the I component over a symbol period and output a digital I component;

Q component integrator/ADC circuitry configured to sum the Q component over a symbol period and output a digital Q component; and a polar converter configured to convert the digital I component and the digital Q component to the first magnitude value.

3. The UWB receiver of claim 1, wherein the first de-spreading circuitry is configured to multiply a first template with the received UWB signal; and the second de-spreading circuitry is configured to multiply a second template with the received UWB signal.

4. The UWB receiver of claim 3, wherein the first template and the second template comprise respective bit value sequences of +1 and −1 values based on a coding scheme.

5. The UWB receiver of claim 4, wherein in each of the first template and the second template, the bit value sequences are separated by 0 values to position the bit value sequence within a selected BPM interval and a selected burst position of a symbol period.

6. The UWB receiver of claim 1, further comprising in the first processing path, first rectifier circuitry configured to rectify a signal output by the first de-spreading circuitry; and in the second processing path, second rectifier circuitry rectify a signal output by the second de-spreading circuitry.

7. The UWB receiver of claim 1, wherein the first processing path comprises a first polar converter that converts a signal output by the first de-spreading circuitry into the first magnitude value and a first phase value; and the second processing path comprises a second polar converter that converts a signal output by the second de-spreading circuitry into the second magnitude value and a second phase value.

8. The UWB receiver of claim 7, wherein the data recovery circuitry is configured to output a bit value of 1 and the first phase value when the first magnitude value exceeds the second magnitude value and output a bit value of 0 and the second phase value when the second magnitude value exceeds the first magnitude value.

9. A method, comprising:

de-spreading a received UWB signal based on a first bit value to generate a first magnitude value;

de-spreading the received UWB signal based on a second bit value to generate a second magnitude value;

comparing the first magnitude value to the second magnitude value; and outputting a bit value based on the comparison.

10. The method of claim 9, further comprising determining the first magnitude value and the second magnitude value by, in first and second processing paths, splitting a de-spread received UWB signal into a I component and a Q component;

summing the I component over a symbol period and output a digital I component;

summing the Q component over a symbol period and output a digital Q component; and converting the digital I component and the digital Q component to a magnitude value.

11. The method of claim 9, comprising de-spreading the received UWB signal based on the first bit value by multiplying the received UWB signal with a first template associated with the first bit value; and de-spreading the received UWB signal based on the second bit value by multiplying the received UWB signal with a second template associated with the second bit value.

12. The method of claim 11, wherein the first template and the second template comprise respective bit value sequences of +1 and −1 values based on a coding scheme.

13. The method of claim 12, wherein in each of the first template and the second template, the bit value sequences are separated by 0 values to position the bit value sequence within a selected BPM interval and a selected burst position of a symbol period.

14. The method of claim 9, further comprising rectifying a de-spread received UWB signal.

15. The method of claim 9, further comprising converting a de-spread received UWB signal based on the first bit value into the first magnitude value and a first phase value; and converting the de-spread received UWB signal based on the second bit value into the second magnitude value and a second phase value.

16. The method of claim 15, further comprising in response to the first magnitude value exceeding the second magnitude value, outputting a bit value of 1 and the first phase value; and in response to the second magnitude value exceeding the first phase value, outputting a bit value of 0 and the second phase value.

17. The method of claim 16, comprising determining information that identifies a transmitter of the received UWB signal based on the output phase value.

18. The method of claim 16, comprising determining a value of a second bit encoded in the received UWB signal based on the output phase value.

19. An ultra-wideband (UWB) receiver, comprising:

de-spreading circuitry that de-spreads a received UWB signal based on a template to generate a de-spread received UWB signal;

I/Q splitter circuitry configured to split de-spread received UWB signal into a I component and a Q component;

I component integrator/analog-to-digital converter (ADC) circuitry configured to sum the I component over a symbol period and output a digital I component;

Q component integrator/ADC circuitry configured to sum the Q component over a symbol period and output a digital Q component; and a polar converter configured to convert the digital I component and the digital Q component to a magnitude value and a phase value.

20. The UWB receiver of claim 19, wherein the template comprises respective bit value sequences of +1 and −1 values based on a coding scheme.

* * * * *